US007761091B2

(12) United States Patent
Dunn, Jr. et al.

(10) Patent No.: US 7,761,091 B2
(45) Date of Patent: Jul. 20, 2010

(54) METHOD AND SYSTEM OF MANAGING VOLUME AND FUNCTIONALITY CONTROL BETWEEN AN AUDIO PLAYER AND WIRELESS EARPHONES

(75) Inventors: William Franklin Dunn, Jr., Austin, TX (US); David M. Friesema, Elk Grove Village, IL (US); Gail I. Gudmundsen, Elk Grove Village, IL (US)

(73) Assignee: Etymotic Research, Inc., Elk Grove Village, IL (US)

( * ) Notice: Subject to any disclaimer, the term of this patent is extended or adjusted under 35 U.S.C. 154(b) by 462 days.

(21) Appl. No.: 11/850,511

(22) Filed: Sep. 5, 2007

(65) Prior Publication Data

US 2008/0058037 A1 Mar. 6, 2008

Related U.S. Application Data

(60) Provisional application No. 60/842,314, filed on Sep. 5, 2006.

(51) Int. Cl.
*H04M 3/00* (2006.01)
*H04B 7/00* (2006.01)

(52) U.S. Cl. ...................... 455/419; 455/420; 455/41.2; 455/575.2; 455/355

(58) Field of Classification Search ................. 455/418, 455/419, 420, 41.2, 569.1, 575.2
See application file for complete search history.

(56) References Cited

U.S. PATENT DOCUMENTS 5,721,783 A * 2/1998 Anderson ................... 381/328
6,684,063 B2 * 1/2004 Berger et al. ............... 455/90.1
7,110,798 B2 * 9/2006 Nassimi ................... 455/575.2
7,457,424 B2 * 11/2008 Katayama et al. ........... 381/105
7,469,051 B2 * 12/2008 Sapashe et al. ............. 381/104
7,529,545 B2 * 5/2009 Rader et al. .............. 455/432.2
7,532,258 B1 * 5/2009 Galgano ..................... 348/734
7,599,679 B2 * 10/2009 Awiszus ..................... 455/403
7,620,433 B2 * 11/2009 Bodley ..................... 455/575.2
7,657,024 B2 * 2/2010 Huang ................... 379/428.02
2002/0039424 A1 4/2002 Watanuki
2004/0151336 A1 * 8/2004 Han et al. ................... 381/370
2004/0247138 A1 12/2004 Wang
2008/0025538 A1 * 1/2008 Zad-Issa ..................... 381/315

FOREIGN PATENT DOCUMENTS

EP 1 196 007 10/2002
EP 1 715 718 10/2006
WO 2004/093490 10/2004

OTHER PUBLICATIONS

International Search Report for PCT/US2007/077633, Jan. 2008.

* cited by examiner

*Primary Examiner*—Duc M Nguyen
(74) *Attorney, Agent, or Firm*—McDonnell Boehnen Hulbert & Berghoff LLP

(57) ABSTRACT

A method and system for providing low-noise, high-fidelity wireless Bluetooth earphones with control operation either at the earphone or the player that operate to control the volume and other functionality from either location in a seamless manner and provide probe volume control display regardless of which location is used.

27 Claims, 6 Drawing Sheets

METHOD AND SYSTEM OF MANAGING VOLUME AND FUNCTIONALITY CONTROL BETWEEN AN AUDIO PLAYER AND WIRELESS EARPHONES

CROSS REFERENCE TO RELATED APPLICATION

The present patent application claims priority under 35 U.S.C. §119(e) to U.S. Provisional Patent Application Ser. No. 60/842,314, filed on Sep. 5, 2006, the entire contents of which are incorporated herein by reference as if fully set forth in this description.

FIELD

The present application relates to volume controls for wireless devices, and more particularly to wireless earphones intended for use with portable audio players.

BACKGROUND

Use of wireless high-fidelity speakers and earphones is well known. Technology within existing wireless earphones is continually improving based on consumer demands. Generally, a wireless earphone system includes the earphones, one for each ear which are coupled via wires, and a transceiver that connects to an audio source. The transceiver will receive audio signals from the audio source, and wirelessly transmit the audio signals to the earphones for play.

Many wireless earphones include electronics for improving sound quality. For example, earphones can include types of noise isolation, so that a listener would not have to turn up a volume to an uncomfortable or unsafe level when using the earphones in trains (and automobiles, airplanes, subways, and on busy city streets) to enjoy music or understand speech. Other existing earphones have good or high fidelity sound reproduction, for example, exhibiting accuracy scores of about 80-95% (where a perfect recording of a live performance played through earphones with a 100% accuracy would produce the same sound at the eardrum as the live performance). The Accuracy Score referred to above is as described in Mead Clifford Killion, "Design and evaluation of high-fidelity hearing aids," Northwestern University Ph.D., 1979, pp 50-52, and also within Mead Clifford Killion, "Design and evaluation of high-fidelity hearing aids," Northwestern University Ph.D. 1979, pp 50-52 (University Microfilms International, 300 N. Zeeb Rd, Ann Arbor, Mich. 48106).

However, typical existing wireless earphone systems lack full functionality control, and simply operate to receive the audio signals for play without the opportunity for a listener to adjust the earphone volume at either the earphone or the audio player at the discretion of the listener. For example, when wireless earphones are used with an MP3 player, such as the Apple iPod® player, a volume control is typically located only at the earphone end of the wireless link, but not at the player end of the wireless link.

At certain times, it would be desirable to enable controls for volume at both the earphone and at the player at the choice of the listener. In addition, it would be desirable to make controls at both locations operational at all times, so that if a listener adjusts controls at one location, that location automatically and seamlessly takes over the function from the controls at the other location.

SUMMARY

A system is described, substantially as shown in and or described in connection with at least one of the figures, as set forth more completely in the claims, which provides user-selectable volume and track-selection control locations that are automatically activated by a user when the user touches the controls at one of the control locations. A further feature is that a common digital logic control center provides a seamless operation for transfer of control between two control locations, so that a change in the ongoing sounds heard by the user are independent of which control location is activated.

In one embodiment, a method of managing volume and functionality control between an audio player and wireless earphones is provided. The method includes receiving a user volume input at the wireless earphones that indicates a desired increase or decrease of loudness of an output of the wireless earphones and sending a signal indicating the user volume input to the audio player via a wireless link. The method also includes adjusting a volume setting in memory of the audio player and sending a volume control setting signal to the wireless earphones via the wireless link that controls an amount to attenuate an audio signal so that the output of the wireless earphones reflects the desired increase or decrease of loudness. The method further includes at the wireless earphones, adjusting a volume of the audio signal.

In another embodiment, a method of adjusting volume of an audio signal at wireless earphones is provided. The method includes receiving via a wireless link a digital full-scale audio signal at the wireless earphones, and receiving a user volume input at the wireless earphones that indicates a desired increase or decrease of loudness of an output of the wireless earphones. The method also includes sending a signal indicating the user volume input to an audio player via the wireless link, and receiving a volume control setting signal at the wireless earphones via the wireless link that controls an amount to attenuate the digital full-scale audio signal so that the output of the wireless earphones reflects the desired increase or decrease of loudness. The method further includes at the wireless earphones, adjusting a volume of the audio signal.

In still another embodiment, a method of managing volume and functionality control between an audio player and wireless earphones is provided. The method includes receiving a user volume input that indicates a desired increase or decrease of loudness of an output of the wireless earphones. The method also includes, if the user volume input is received at the audio player, (i) adjusting a volume setting in memory of the audio player, (ii) sending a volume control setting signal to the wireless earphones via a wireless link that controls an amount to attenuate an audio signal so that the output of the wireless earphones reflects the desired increase or decrease of loudness, and (iii) at the wireless earphones, adjusting a volume of the audio signal. The method further includes if the user volume input is received at the wireless earphones, (i) sending a signal indicating the user volume input to the audio player via the wireless link, (ii) adjusting an volume setting in memory of the player, (iii) receiving the volume control setting signal at the wireless earphones via the wireless link, and (iii) at the wireless earphones, adjusting a volume of the audio signal.

In yet another embodiment, a wireless earphone system is provided that includes two earpieces, a transceiver within one of the two earpieces to send and receive signals wirelessly, control buttons on one of the two earpieces to receive user inputs at the earpiece, and an attenuator within one of the two earpieces to attenuate an audio signal to a desired degree of loudness. The control buttons include volume control buttons and track selection control buttons and are coupled to the transceiver to send the user inputs to the transceiver. The attenuator attenuates the audio signal upon receiving a volume control setting signal that was wirelessly received at the transceiver that is generated according to the user inputs.

These and other features and advantages of the present invention may be appreciated from a review of the following detailed description of the present invention, along with the accompanying figures.

DETAILED DESCRIPTION

The present application provides a system and method for use with a wireless earphone to audio player system. The system allows a user to adjust controls at either the earphones or the audio player to control audio play at the earphones. The earphones will receive audio signals from the player wirelessly for play. The player will send digital full-scale signals (e.g., full-power audio signals) to the earphones, and the user may adjust a volume of the audio at the earphones themselves. In that instance, the earphones will send a signal to the audio player to indicate a change in the volume, so that a display on the player will synchronize with the earphone volume level and show the current volume level.

Alternatively, the user may adjust a volume of the audio at the player. In that instance, the player will send a volume control signal to the earphones, after sending the digital full-scale audio signal, to indicate to the earphones the level at which to attenuate the audio signals. The volume display on the audio player will adjust accordingly.

Figure 1A:
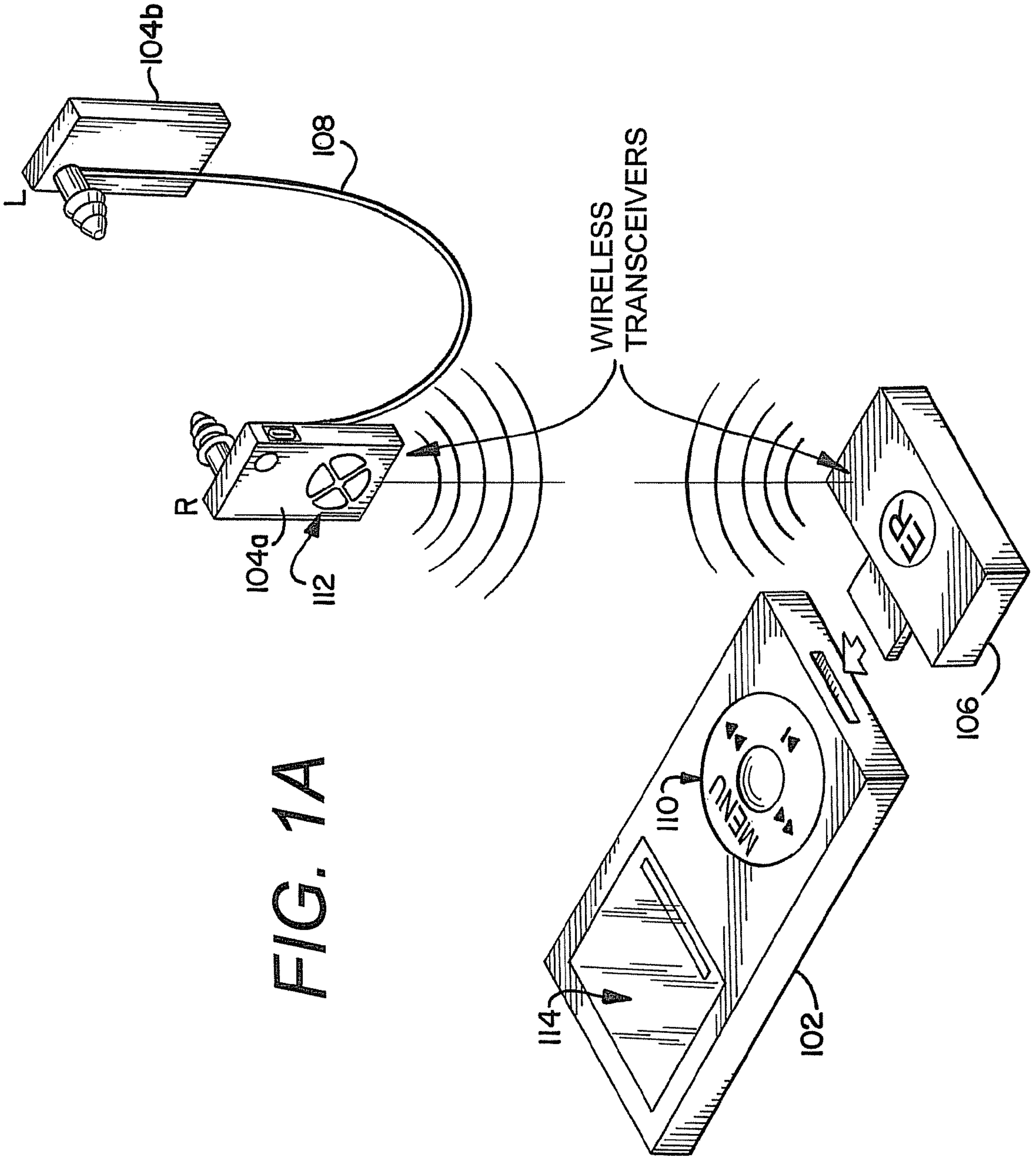
FIG. 1A illustrates an example system with wireless transceivers providing audio signals from an audio player to wireless earphones.

FIG. 1A illustrates an example system including an audio player 102 wirelessly sending audio signals to right and left earphones 104*a-b*. The audio player 102 includes a transceiver 106, which may be integral with the audio player 102 or a stand-alone component that connects to the audio player 102 as shown in FIG. 1, which receives the audio signals from the audio player 102 and wirelessly transmits the audio signals to the earphones 104*a-b*. The right and left earphones 104*a-b* are connected via a cable 108. As such, only one of the right or left earphones 104*a-b* may include a transceiver to receive the wireless signals from the transceiver 106. As shown, only the right earphone 104*a* includes a transceiver and communicates with the transceiver 106 wirelessly, and also communicates with the left earphone 104*b* via the cable 108. Alternatively, both the right and left earphone 104*a-b* could include transceivers to communicate wirelessly with the transceiver 106 and with each other, so that no cable would be necessary to connect the right and left earphones 104*a-b*.

The transceiver 106, and the transceiver included in the earphone 104*a* (not shown), may be any type of wireless transceiver so that the transceiver 106 and the earphone 104*a* may communicate wirelessly using any number of wireless protocols. For example, the transceivers may be Bluetooth® transceivers, so as to provide for short range wireless communications. One specific example of a Bluetooth® transceiver is the Broadcom Bluetooth circuits BCM2037 with Z sound software, which can provide 16-bits of effective dynamic range and freedom from distortion that may be required for true high-fidelity applications. The transceivers may also be of the type to provide for long range wireless communications as well, such as using a CDMA protocol for example.

The audio player 102 includes controls 110 to control functions of the player 102, such as to control a volume or track/music selection for example. In addition, controls may be included on one of or both of the right and left earphones 104*a-b* as well. As shown, volume and track selection controls 112 are included on the right earphone 104*a*. Using the system in FIG. 1, a user could use either the audio player 102 or the earphones 104*a-b* to control a volume level of an output signal heard at the earphones 104*a-b* or to control a track/music selection. In addition, a display 114 on the audio player 102 will update to show the changes based on control signals received from either the controls 110 on the audio player 102 or from the controls 112 on the earphone 104*a*.

Figure 1C:
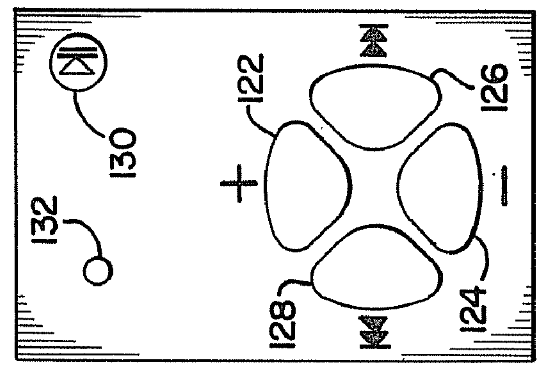
FIG. 1C illustrates an example front view of one of the wireless earphones of FIG. 1A.
Figure 1B:
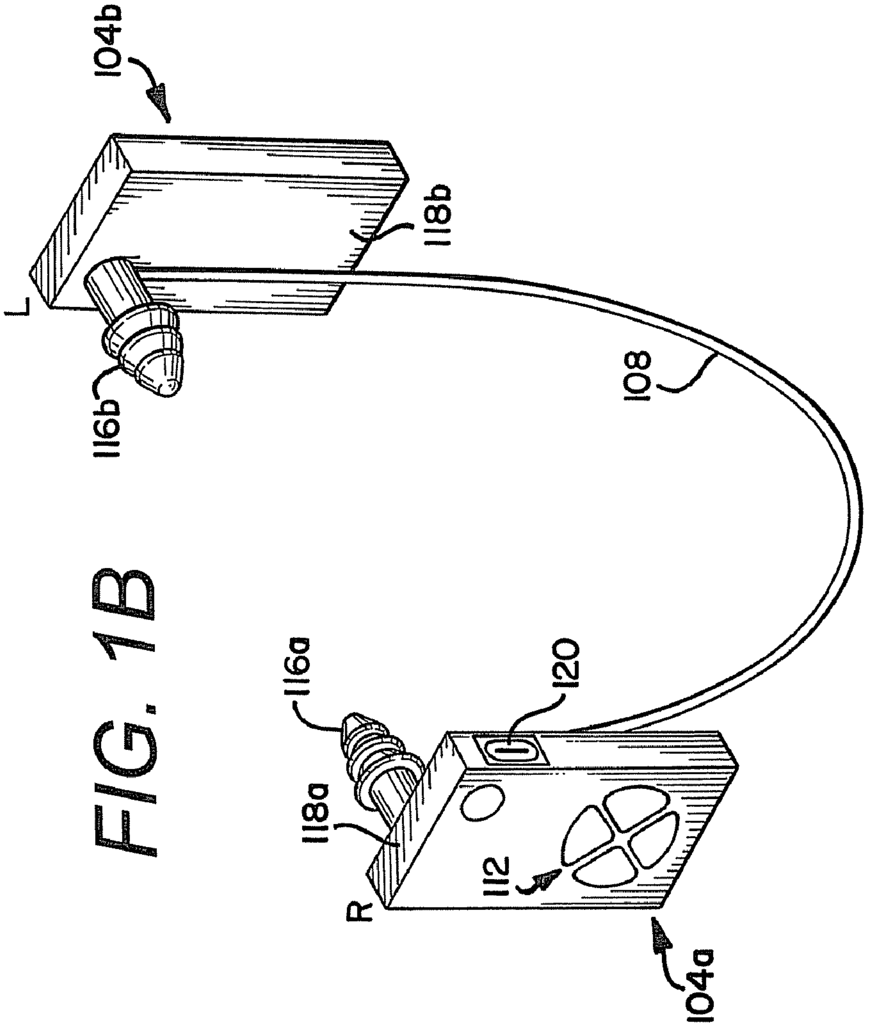
FIG. 1B shows a more detailed view of the wireless earphones of FIG. 1A.

FIG. 1B shows a more detailed view of the earphones 104*a-b*. Each earphone 104*a-b* includes a speaker 116*a-b* and a control piece 118*a-b*, which houses electronic circuitry comprising a transceiver, an antenna, attenuators, and circuitry to receive user inputs from the control buttons 112. One (or both) of the control pieces 118*a-b* includes a USB input 120 that may be used to charge the battery of the earphones 104*a-b*, for example.

FIG. 1C illustrates an example front view of one of the earphones 104*a-b* to illustrate the control buttons 112. The control buttons 112 include, for example, a volume increase 122 and a volume decrease 124 button, a forward 126 and a reverse 128 button, and a play/pause/power 130 button. The volume increase 122 and volume decrease 124 can be used by a user to indicate a desired increase or decrease in loudness of an output of the wireless earphones. The forward 126 and reverse 128 buttons may be used to skip to the next/previous track, or to fast forward/rewind within a track, for example. The front of one of the earphones 104*a-b* also includes an LED 132 that may indicate power of the earphones, and may change colors during charging or to indicate a low power of the earphones. The LED 132 may also indicate that the earphones 104*a-b* are communicating via the Bluetooth® protocol.

Exemplary products corresponding to the audio player 102 and the earphones 104*a-b* have been found to be the Apple iPod® player, available from the Apple Store in Cupertino, Calif. and the ety8™ Bluetooth® high-fidelity noise-isolating earphones, available from Etymōtic Research in Elk Grove Village, Ill.

Figure 2A:
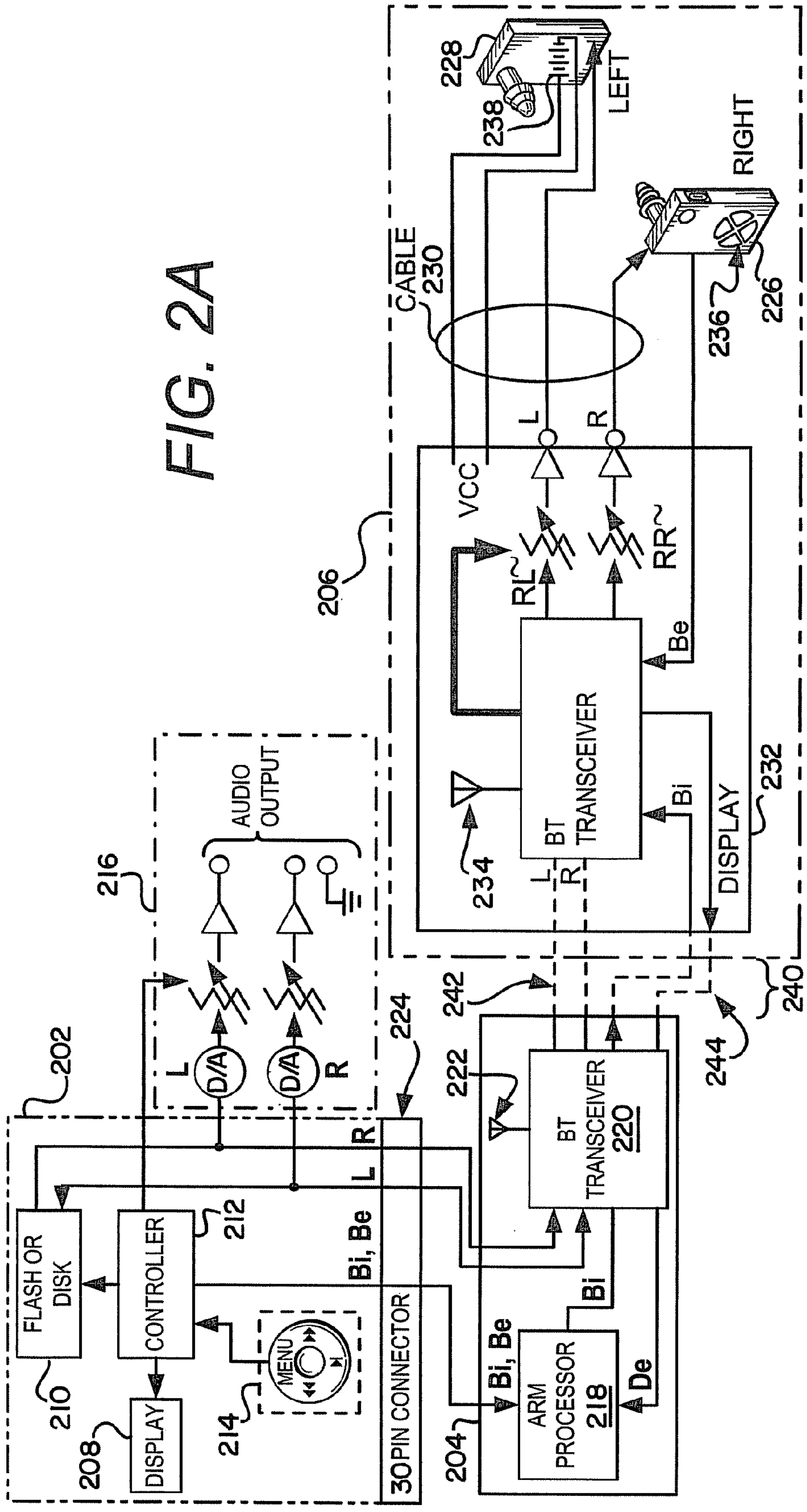
FIG. 2A illustrates a block diagram showing an example wireless audio player system.

FIG. 2A illustrates a block diagram showing a wireless audio player system. The system includes an audio player 202, coupled to a transceiver 204 that wirelessly sends audio signals to wireless earphones 206. The audio player 202 includes a display 208, memory 210, a processor/controller 212 and control buttons 214. The audio player 202 further includes an output interface 216 with circuitry to output audio signals to a left and a right earphone that would be physically connected to the audio player 202, such as through a standard headphone jack.

The transceiver device 204 is shown to include a processor 218 (e.g., an ARM7 TDMI processor or other 32-bit embedded RISC processor), and a transceiver 220 (e.g., a Bluetooth® transceiver) that includes an antenna 222. The processor 218 and the transceiver 220 may be embodied as one processor as well. For example, the processor 218 may be embodied as software running on a portion of an integrated circuit comprising the transceiver 220.

The transceiver 204 couples to the audio player 202 via a 30 pin connector 224, which may be a standard dock connector that is a rectangular, 30 terminal connector that includes pins for power and data transfer. The transceiver device 204 may include an identification chip that permits information about the audio player 202 controls and earphone 206 controls to be exchanged via the Bluetooth® protocol.

The transceiver device 204 may also be presented in an alternative form. For example, instead of connecting to the audio player 202 through a 30-pin connector, the transceiver may plug into a standard headphone or earphone jack on the audio player (not shown) and may also include a multi-connector jack for power. As such, the transceiver device 204 may be any general transceiver that can communicate using the Bluetooth® protocol.

The earphones 206 include a right earphone 226 and a left earphone 228 connected via a cable 230. The earphones 206 have a transceiver 232 (e.g., a Bluetooth® transceiver) that includes an antenna 234. The transceiver 232 may be physically located within either the right earphone 226 or left earphone 228. In addition, either or both of the right earphone 226 or the left earphone 228 includes control buttons to control volume and music/track selection. In FIG. 2, the right earphone 226 is shown to include control buttons 236 and the transceiver 232. Additionally, one or both of the right earphone 226 and left earphone 228 will include a power source (e.g., battery 238), which is shown to be within the left earphone 228 in FIG. 2, and a voltage control circuit (VCC) to provide power to the transceiver 232 and the right earphone 226. The earphones 206 wirelessly communicate with the transceiver 204 via a wireless link 240.

The processors and transceivers within the audio player 202, transceiver device 204 and earphones 206 may access memory to execute software functions stored therein, such as to adjust volume levels, select music tracks, etc. One skilled in the art of computer systems design will understand that the example embodiments are not limited to any particular class or model of processor. The processors may operate according to an operating system, which may be any suitable commercially available embedded or disk-based operating system, or any proprietary operating system. Further, the processors may comprise one or more smaller central processing units, including, for example, a programmable digital signal processing engine or may also be implemented as a single application specific integrated circuit (ASIC) to improve speed and to economize space.

In general, it should be understood that the audio player 202, transceiver device 204 and earphones 206 could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data. It should also be noted that the audio player 202 generally executes programs resident at the audio player 202 under the control of an operating system.

Moreover, memory within any of the audio player 202, transceiver device 204 or earphones 206 may include random access memory (RAM), flash memory or long term storage, such as read only memory (ROM) or magnetic disks. The memory may include software functions executable by a processor that are provided using machine language instructions or software with object-oriented instructions, such as the Java programming language. However, other programming languages (such as the C++ programming language for instance) could be used as well.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

In operation, a user will turn on the audio player 202 using the controls 214 and instruct the controller 212 to access the memory 210 to play a stored music selection. The controller 212 will display the selected music selection on the display 208 and also send a control signal (labeled Bi) through the 30-pin connector 224 to the transceiver device 204. The processor 218 will receive the control signal and instruct the BT transceiver 220 to access the memory 210 to receive the selected audio data and to send the audio data to the earphones 206 via the wireless link 240 over an audio path 242. The audio path 242 is a bi-directional wireless Bluetooth® link between the transceiver device 204 and the earphones 206 that may be used to stream audio signals. Signals are sent for both the left and right earphones over the audio path 242.

The transceiver 204 will send digital full-scale audio signals to the earphones 206, and the audio signals can be attenuated after reception at the earphones 206. Digital full-scale audio signals or digital-full scale audio signals are sent through the wireless link to provide a highest possible signal-to-noise ratio at any volume control setting. Digital full-scale audio signals are signals that have a known relied-upon output level or known sound-pressure level that is accepted by listener.

The earphones 206 will either receive instructions for attenuating the audio signals from the controls 236 on the earphones 206 or via a control signal sent from the audio player 202. If the volume control function were to occur at the audio player 202 so that the signal sent over the wireless link was attenuated, noise in the wireless link 238 and circuit noise in the right earphone 226 and left earphone 228 amplifiers would become audible within quieter passages of the audio and in quiet sections between track selections. However, with the control of the audio signal level in the earphone, earphone amplifiers can be muted during quiet sections between passages.

As such, if the listener uses the controls 214 on the audio player 202 to adjust a volume of the audio data, the controller 212 sends the control signal (labeled Bi) to the transceiver 204, which forwards the control signal to the earphones 206 over the wireless link 240 via a control path 244. The transceiver 232 in the earphones 206 relays the control signal to the attenuators in the earphones 206 to instruct the earphones 206 how to attenuate the digital full-scale audio signal that was received. The digital audio attenuators in the earphones, $RL^{\sim}$ and $RR^{\sim}$, can be used for volume control function permitting a maximum possible dynamic range and minimum noise available from the system to be presented at all times. The digital audio attenuators in the earphones will then adjust the audio data according to the control signal Bi and then send corresponding signals to the right earphone 226 and left earphone 228.

At the same time, the display 208 of the audio controller is updated to show the current volume settings. The display 208 may include software running on the controller 212 that controls graphics of the display 208 so that once the volume settings in the memory 210 are adjusted, the display graphics are then updated.

On the other hand, if the listener were to use the controls 236 on the earphones 206 to adjust a volume of the audio signal, the earphones 206 will send a control signal (labeled Be) to the audio player 202 through the transceiver 204. The audio player 202 will then receive the control signal and adjust the volume setting in the audio player 202 accordingly. In addition, the transceiver sends a display control signal to the display 208 via the controller 212 of the audio player 202 so that the display 208 of the volume setting is updated accordingly. Alternatively, the controller 212 will automatically update the display 208 of the audio player 202 after updating the memory 210.

The audio player 202 then sends a control signal (labeled Bi) back to the earphones 206 to instruct the earphones 206 how to adjust/attenuate the audio signal so that an output of the wireless earphones reflects the desired increase or decrease in loudness. In this manner, either the controls on the earphones or the controls on the audio player can be used to adjust the volume of the audio signal so that a main audio control on the audio player is adjusted. For example, whenever the controls 214 for volume are adjusted, or when the controls 236 for volume are adjusted, messages are generated that each are received at the controller 212 of the audio player 202, which sets an volume in memory of audio player 202. As such, both controls 214 and 236 could be operated simultaneously to adjust the volume. The volume is always controlled by the audio player 202, which in turn, sends messages to the earphones 206 to instruct the earphones 206 how to adjust the signal.

Figure 2B:
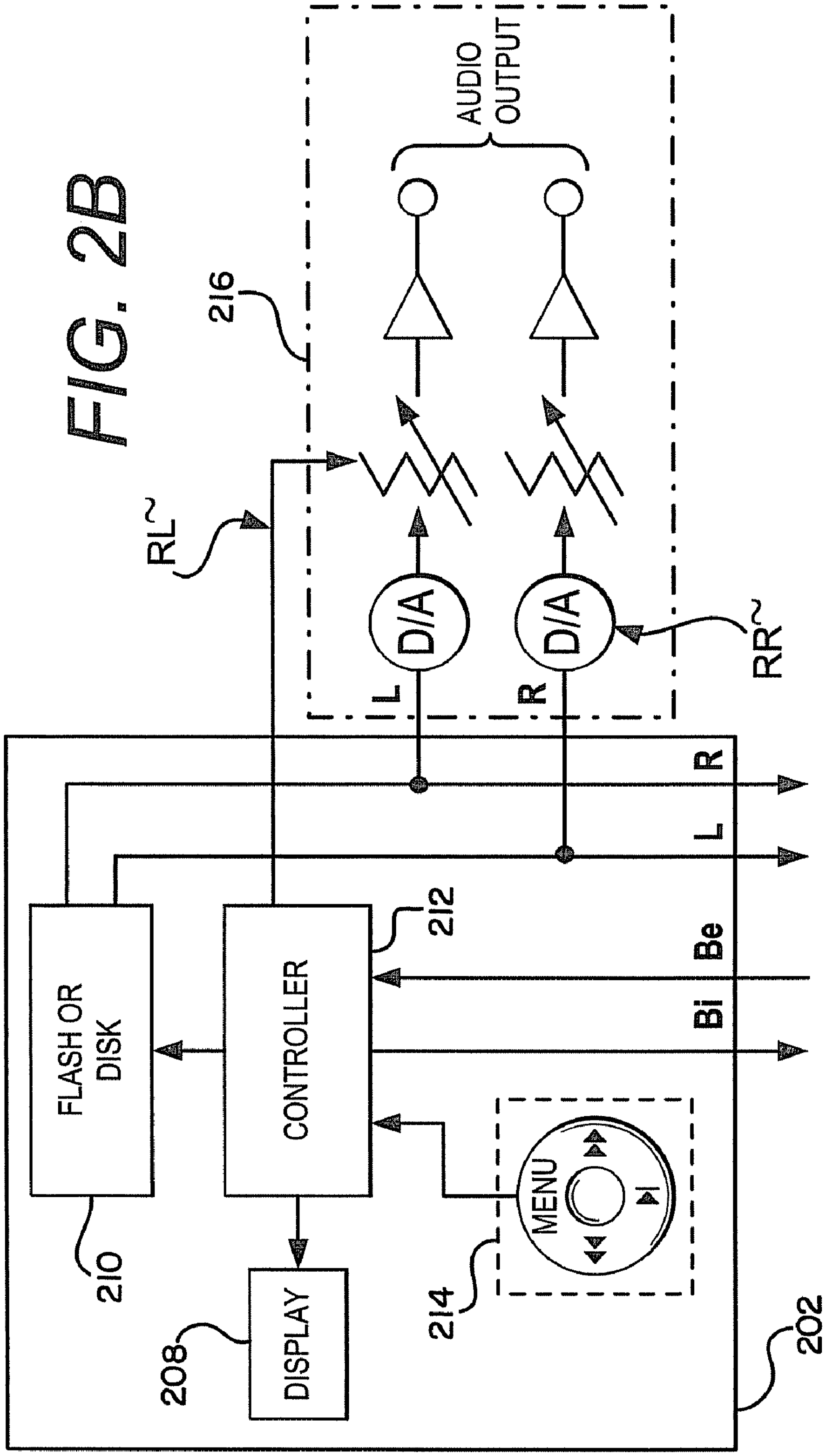
FIG. 2B illustrates a block diagram of an example audio player from the wireless audio player system in FIG. 2A.

Thus, the ARM or similar processor 218 in the dongle transceiver 206 is programmed to take user inputs Be from earphone volume and track controls and send the inputs to the controller 212 in the audio player 202 along with control information that indicates which inputs (Be from the earphone audio and track controls or Bi from the player audio and track controls) to use. The controller 212 provides the track control signals directly to the flash or disk memory 210, the display control signals directly to the display 208, and makes the corresponding volume control settings available to the ARM or similar processor 218 in the transceiver 206, which sends the control settings to the earphones 206. This message flow is generally shown in FIG. 2B.

Figure 2C:
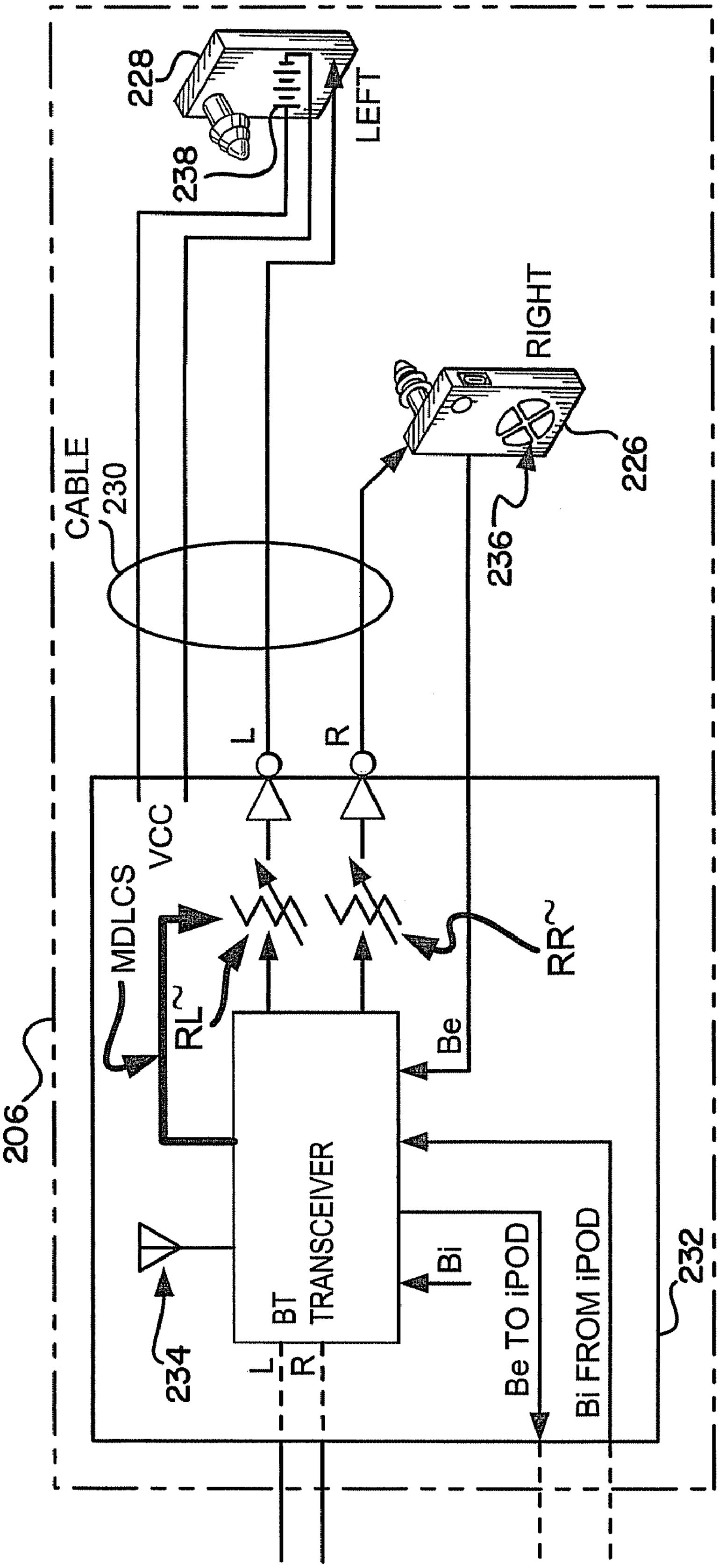
FIG. 2C illustrates a block diagram of an example wireless earphone(s) from the wireless audio player system in FIG. 2A.

At the earphones 206, volume control signals Be are received from the transceiver 204 and a master digital logic circuit translates the control signals into master digital logic control signals (MDLCS) to left and right digital attenuator signals $RL^{\sim}$ and $RR^{\sim}$. This message flow is generally shown in FIG. 2C. Note that the left and right digital attenuators $RL^{\sim}$ and $RR^{\sim}$ may be positioned within their respective earpiece, or may both be positioned within one earpiece so that signals are adjusted and then sent to the proper earpiece for output.

Conceptually, in operation, the earphones 206 generally have two circuits: one to receive audio and control signals from the audio player 202, attenuate the signals and then play the signals through speakers; and a second to receive user inputs from the control buttons 236 and send the user inputs to the transceiver 204 via the wireless link 240. In this configuration, the earphones 206 will not attenuate an audio signal based on the user inputs directly received at the control buttons 236 on the earphones 206. Rather, the earphones 206 only attenuate an audio signal when instructed to do so by the audio player 202.

Using the described messaging sequence to adjust a volume of the audio signal, the volume setting in memory will always be held by the audio player 202. There will not be a separate volume setting set for the earphones 206 and audio player 202. The audio signal output at the earphones 206 will always correspond to the volume level as shown at the audio player 202, and thus the volume levels at each of the audio player 202 and the earphones 206 will be synchronized. If the earphones 206 operated independently to adjust the volume, and the audio player 202 then further adjusted the volume, the volume setting level at the audio player 202 would not be the true volume level of the audio data output at the earphones 206. By having the earphones 206 communicate with the audio player 202 to indicate an intention to adjust the volume, and then waiting to receive the control signal instructing the earphones 206 to do so, the volume level at the audio player corresponds to the volume level of the audio output at the earphones 206.

In a similar fashion, the listener can use the controls 214 on the audio player 202 or the controls 236 on the earphones 206 to adjust a track selection using standard play, pause, forward or reverse control buttons. If the listener uses the controls 214 on the audio player 202 to play/pause/forward/reverse a music track, the audio player 202 operates in a standard fashion to perform the requested function, and simply adjusts the transmission of audio data to the earphones 206 according to the requested function. If the listener uses the controls 236 on the earphones 206 to play/pause/forward/reverse a music track, a control signal is sent from the earphones 206 to the transceiver 204 over a Bluetooth® error free signaling channel (e.g., channel lower in the protocol stack message that ensures error-free delivery). The transceiver 204 then translates the control signal to a form that can be sent over the 30-pin connector and received and recognized by the audio player 202. The audio player 202 will then operate in a standard fashion to perform the requested function.

In addition, the controls forward/reverse can also be used to fast forward/rewind through a track in addition to skipping to a beginning or end of the track. The controls 236 mimic the controls 214 on the audio player 202.

To provide automatic user-selectable choice of location of active volume and track-selection controls, the controller 212 in the audio player 202 is programmed to monitor any activity at the volume-control and track-selection controls on both the audio player 202 and the earphones 206. For example, the controller 212 is programmed to react only to up-or-down (or forward-or-backward) information from any control as if no other control exists so that normal control logic could be applied to both functions.

In addition, FIG. 2 illustrates the controls 236 on the right earpiece 226, however, the control could also be placed on the left earpiece 228 as well. Alternatively, a user could simply wear the earpieces in opposite ears, so that the right earpiece 226 would be placed in the left ear and the controls would be in a position better-suited for a left-handed individual. The earphones 206 could then be programmed to switch the outputs to the earpieces so that a proper output signal is sent to each of the left and right earpieces, e.g., to maintain a bass signal of the signal in a desired earpiece. The earphones 206 could simply send all the left earpiece output signals to the right earpiece, and send all the right earpiece output signals to the left earpiece. The attenuator within the earphones 206 may include a switch that can be operated to send outputs to the desired earpieces.

Figure 3:
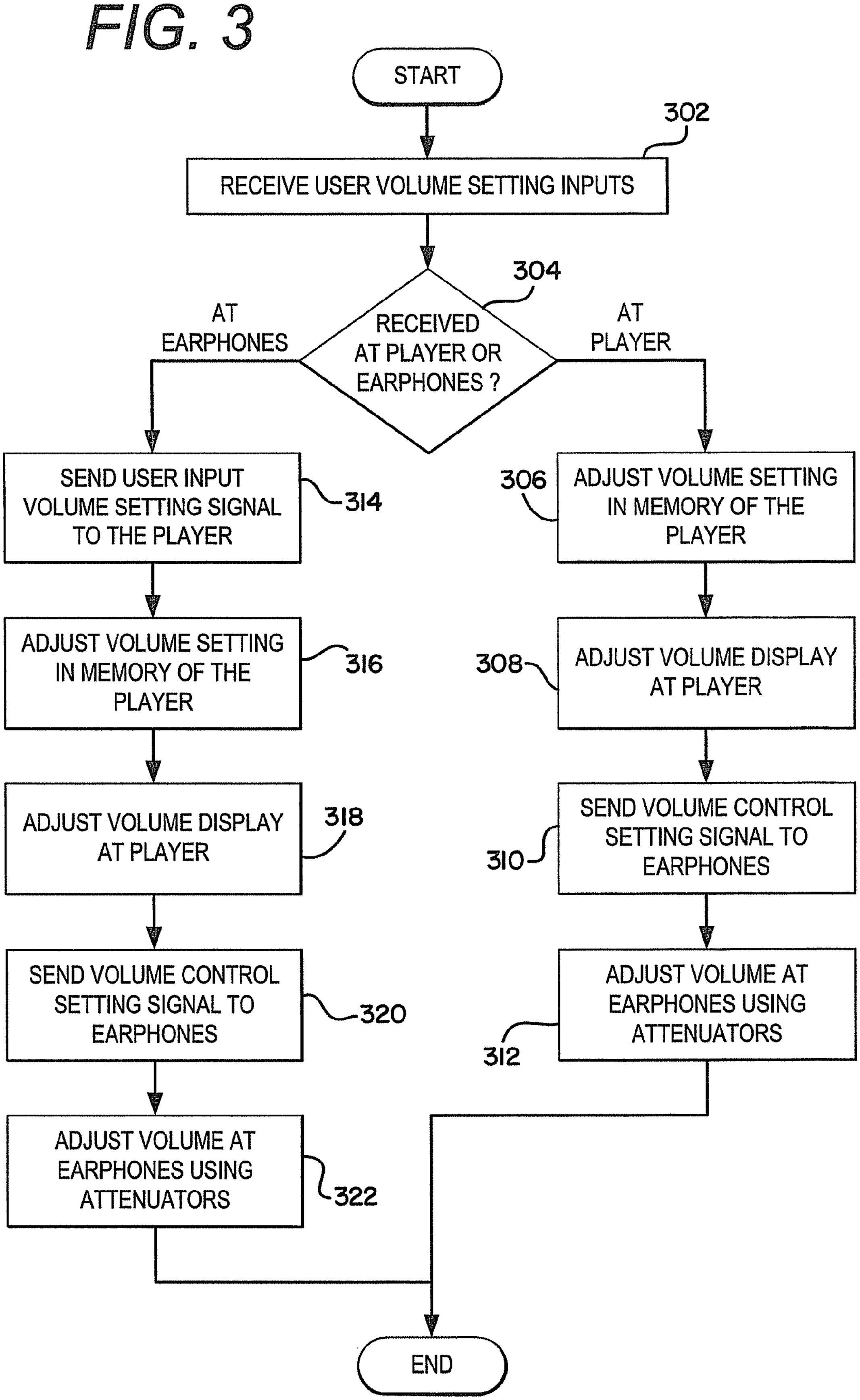
FIG. 3 is a flowchart illustrating example functional steps of a method for managing volume control between an audio player and wireless earphones.

FIG. 3 is a flowchart illustrating functional steps of a method for managing volume control between an audio player and wireless earphones. It should be understood that each block in this flowchart (and within other flow diagrams presented herein) may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments. The computer program code may be embodied in a computer program product that includes one or more computer readable media, as described as being present within the audio player 202, the transceiver 204 or the earphones 206, for example. The computer readable medium can include a communications or transmission medium, such as, a bus or a communication link, either optical, wired or wireless having program code segments carried thereon as digital or analog data signals.

Initially, as shown at block 302, user volume setting inputs will be received. The inputs will either be received through the control buttons on the audio player or through the control buttons on the wireless earphones, as shown at block 304. If the inputs are received at the audio player, the audio player will then adjust a volume setting in the memory of the audio player, as shown at block 306, and adjust a volume setting display at the player according, as shown at block 308. The audio player will then send a volume control setting signal to the wireless earphones, as shown at block 310. Subsequently, the earphones will adjust the volume using attenuators within the earphones, as shown at block 312.

If the inputs are received at the earphones, then initially, the earphones will send a user input volume setting signal to the audio player, as shown at block 314. After receiving the signal from the earphones, the audio player will then perform the same steps as if the inputs were received at the audio player. For example, the audio player will then adjust a volume setting in the memory of the audio player, as shown at block 316, and adjust a volume setting display at the player according, as shown at block 318. The audio player will then send a volume control setting signal to the wireless earphones, as shown at block 320. Subsequently, the earphones will adjust the volume using attenuators within the earphones, as shown at block 322.

The method shown in the flowchart of FIG. 3 assumes that a full-power or digital full-scale audio signal is sent to the earphones, and the audio signal is only attenuated at the earphones. In this manner, a highest signal-to-noise ratio can be achieved so that a high quality audio signal will be received wirelessly at the earphones, and the earphones may then apply processing techniques to a high-quality signal. Using wireless earphones, the audio signal is always adjusted at the earphones themselves, rather than adjusting the signal at the audio player and sending the adjusted signal to the earphones, to eliminate noise within an output signal. The earphones will only adjust a volume (or amplitude) of the audio signal upon receiving instruction to do so from the audio player so that the audio player will always have a correct volume level setting stored at the audio player.

The present application provides a manner to allow controls on wireless earphones to operate as if the controls were directly at the audio player so that a display in the audio player automatically shows a correct volume-control setting. Digital audio control signals from the audio player can be used to control volume settings on the audio player, and simultaneously sent over a wireless link to the earphones to control the volume control attenuators of the left and right digital attenuators $RL^{\sim}$ and $RR^{\sim}$ in the earphone to control play of the audio. Similarly, digital audio control signals from the earphones can be used to control the volume control attenuators of the left and right digital attenuators $RL^{\sim}$ and $RR^{\sim}$ in the earphone to control play of the audio, and simultaneously sent over the wireless link to the audio player to control volume settings on the audio player.

Although the present wireless earphone system has been described including wireless earphones and a portable audio player, the wireless earphones could be used with any type of audio player. For example, the wireless earphones could be used with any Bluetooth® compatible device, so that the wireless earphones may link to the device to receive wireless signals according to the Bluetooth® protocol. A user could then use the wireless earphones with a standard stereo, which includes a Bluetooth® transceiver, to receive audio signals wirelessly from the stereo.

While the invention has been described in conjunction with presently preferred embodiments of the invention, persons of skill in the art will appreciate that variations may be made without departure from the scope and spirit of the invention. The apparatus and methods described herein may be implemented in hardware, software, or a combination, such as a general purpose or dedicated processor running a software application through volatile or non-volatile memory. The true scope and spirit of the invention is defined by the appended claims, which may be interpreted in light of the foregoing.

What is claimed is:

1. A method of managing volume and functionality control between an audio player and wireless earphones comprising:

receiving a user volume input at the wireless earphones, wherein the user volume input indicates a desired increase or decrease in loudness of an output of the wireless earphones;

sending a signal indicating the user volume input to the audio player via a wireless link;

adjusting a volume setting in memory of the audio player;

sending a volume control setting signal to the wireless earphones via the wireless link, the volume control setting signal controlling an amount to attenuate an audio signal so that the output of the wireless earphones reflects the desired increase or decrease in loudness; and at the wireless earphones, adjusting a volume of the audio signal.

2. The method of claim 1, wherein the volume setting in the memory of the audio player corresponds to the volume of the output at the wireless earphones.

3. The method of claim 1, wherein the wireless link operates according to the Bluetooth® protocol.

4. The method of claim 1, further comprising:

receiving a user track selection input at the wireless earphones, wherein the user track selection input indicates whether to play, pause, forward, or reverse the output of the wireless earphones; and sending a signal indicating the user track selection input to the audio player via the wireless link.

5. The method of claim 1, further comprising sending a digital full-scale audio signal to the wireless earphones via the wireless link.

6. The method of claim 1, further comprising adjusting a display of the volume setting at the audio player.

7. The method of claim 1, wherein the wireless earphones include a right earpiece and a left earpiece, and wherein the audio signal includes a right audio signal for play at the right earpiece and a left audio signal for play at the left earpiece, and wherein the method further comprises:

sending the right audio signal to the left earpiece; and sending the left audio signal to the right earpiece.

8. A method of adjusting volume of an audio signal at wireless earphones comprising:

receiving via a wireless link a digital full-scale audio signal at the wireless earphones;

receiving a user volume input at the wireless earphones, wherein the user volume input indicates a desired increase or decrease of loudness of an output of the wireless earphones;

sending a signal indicating the user volume input to an audio player via the wireless link;

receiving a volume control setting signal at the wireless earphones via the wireless link, the volume control setting signal controlling an amount to attenuate the digital full-scale audio signal so that the output of the wireless earphones reflects the desired increase or decrease of loudness; and at the wireless earphones, adjusting a volume of the audio signal.

9. The method of claim 8, further comprising adjusting a volume setting in memory of the audio player.

10. The method of claim 9, further comprising adjusting a display of the volume setting at the audio player.

11. The method of claim 8, wherein the wireless link operates according to the Bluetooth® protocol.

12. The method of claim 8, further comprising:

receiving a user track selection input at the wireless earphones, wherein the user track selection input indicates whether to play, pause, forward, or reverse the output of the wireless earphones; and sending a signal indicating the user track selection input to the audio player via the wireless link.

13. A method of managing volume and functionality control between an audio player and wireless earphones comprising:

receiving a user volume input, wherein the user volume input indicates a desired increase or decrease of loudness of an output of the wireless earphones;

if the user volume input is received at the audio player, (i) adjusting a volume setting in memory of the audio player, (ii) sending a volume control setting signal to the wireless earphones via a wireless link, the volume control setting signal controlling an amount to attenuate an audio signal so that the output of the wireless earphones reflects the desired increase or decrease of loudness, and (iii) at the wireless earphones, adjusting a volume of the audio signal; and if the user volume input is received at the wireless earphones, (i) sending a signal indicating the user volume input to the audio player via the wireless link, (ii) adjusting the volume setting in the memory of the audio player, (iii) receiving the volume control setting signal at the wireless earphones via the wireless link, and (iv) at the wireless earphones, adjusting a volume of the audio signal.

14. The method of claim 13, further comprising if the user volume input is received at the audio player or if the user volume input is received at the wireless earphones, adjusting a display of the volume setting at the audio player.

15. The method of claim 13, wherein the wireless link operates according to the Bluetooth® protocol.

16. The method of claim 13, further comprising:

receiving a user track selection input at the wireless earphones, wherein the user track selection input indicates whether to play, pause, forward, or reverse the output of the wireless earphones; and sending a signal indicating the user track selection input to the audio player via the wireless link.

17. The method of claim 13, wherein a volume setting of the audio signal at the audio player and at the wireless earphones is synchronized.

18. The method of claim 13 further comprising:

sending a digital full-scale audio signal to the wireless earphones via the wireless link; and attenuating the digital full-scale audio signal at the wireless earphones in response to receiving the volume control setting signal from the audio player.

19. A wireless earphone system comprising:

two earpieces;

a transceiver within one of the two earpieces to send and receive signals wirelessly;

control buttons on one of the two earpieces to receive user inputs at the earpiece, wherein the control buttons include volume control buttons and track selection control buttons, the control buttons coupled to the transceiver to send the user inputs to the transceiver; and an attenuator within one of the two earpieces to attenuate an audio signal to a desired degree of loudness, wherein the attenuator attenuates the audio signal upon receiving a volume control setting signal that was wirelessly received at the transceiver, wherein the volume control setting signal is generated according to the user inputs.

20. The wireless earphone system of claim 19, wherein the two earpieces are connected via a wired link.

21. The wireless earphone system of claim 19, wherein the control buttons receive user volume inputs at the wireless earphones, wherein the user volume setting inputs indicate a desired increase or decrease of loudness of an output of the wireless earphones.

22. The wireless earphone system of claim 19, wherein in response to receiving a user input at the control buttons, the transceiver wirelessly sends a signal indicating the user input to an audio player via a wireless link.

23. The wireless earphone system of claim 19, further comprising an audio player to wirelessly receive the user inputs from the transceiver, to generate the volume control setting signal according to the user inputs, and to send the volume control setting signal to the transceiver to instruct the attenuator to attenuate the audio signal.

24. The wireless earphone system of claim 23, further comprising the audio player in response to receiving the user inputs from the transceiver, adjusting a volume setting in memory of the audio player and adjusting a display of the volume setting at the audio player.

25. The wireless earphone system of claim 19, wherein the transceiver sends and receives signals wirelessly according to the Bluetooth® protocol.

26. The wireless earphone system of claim 19, wherein the two earpieces include a right earpiece and a left earpiece, and wherein the audio signal includes a portion for play at the right earpiece and a portion for play at the left earpiece, and wherein the attenuator further includes a switch that may be operated to send the portion for play at the right earpiece to the left earpiece and to send the portion for play at the left earpiece to the right earpiece.

27. The wireless earphone system of claim 19, wherein each of the two earpieces further includes a speaker.

* * * * *